United States Patent
Ganor et al.

(10) Patent No.: US 10,657,077 B2
(45) Date of Patent: May 19, 2020

(54) HYPERCONVERGED NVMF STORAGE-NIC CARD

(71) Applicant: Mellanox Technologies, Ltd., Yokneam (IL)

(72) Inventors: Avraham Ganor, Shoham (IL); Reuven Badash, Petah Tikva (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 16/104,958

(22) Filed: Aug. 20, 2018

(65) Prior Publication Data

US 2020/0057735 A1     Feb. 20, 2020

(51) Int. Cl.

| | |
|---|---|
| *G06F 3/00* | (2006.01) |
| *G06F 13/00* | (2006.01) |
| *G06F 13/38* | (2006.01) |
| *G06F 13/40* | (2006.01) |
| *G06F 13/16* | (2006.01) |
| *G06F 13/42* | (2006.01) |

(52) U.S. Cl.
CPC ...... *G06F 13/1668* (2013.01); *G06F 13/4068* (2013.01); *G06F 13/4282* (2013.01); *G06F 2213/0026* (2013.01)

(58) Field of Classification Search
CPC . G06F 3/00; G06F 13/00; G06F 13/38; G06F 13/40
See application file for complete search history.

(56) References Cited

U.S. PATENT DOCUMENTS

| | | | |
|---|---|---|---|
| 9,830,082 B1 | 11/2017 | Srinivasan et al. | |
| 10,162,793 B1 * | 12/2018 | Bshara | ............... G06F 15/17331 |
| 2016/0085718 A1 * | 3/2016 | Huang | ................... H04L 29/08 |
| | | | 709/213 |

OTHER PUBLICATIONS

NVM Express Inc, "NVM Express over Fabrics," Revision 1.0, 49 pages, Jun. 5, 2016.

* cited by examiner

*Primary Examiner* — David E Martinez
(74) *Attorney, Agent, or Firm* — Kligler & Associates Patent Attorneys Ltd

(57) ABSTRACT

A storage and communication apparatus for plugging into a server, includes a circuit board, a bus interface, a Medium Access Control (MAC) processor, one or more storage devices and at least one Central Processing Unit (CPU). The bus interface is configured to connect the apparatus at least to a processor of the server. The MAC is mounted on the circuit board and is configured to connect to a communication network. The storage devices are mounted on the circuit board and are configured to store data. The CPU is mounted on the circuit board and is configured to expose the storage devices both (i) to the processor of the server via the bus interface, and (ii) indirectly to other servers over the communication network.

18 Claims, 3 Drawing Sheets

HYPERCONVERGED NVMF STORAGE-NIC CARD

FIELD OF THE INVENTION

The present invention relates generally to computer systems, and particularly to computer systems with hyperconverged infrastructure.

BACKGROUND OF THE INVENTION

Converged Infrastructure (CI) is the grouping of multiple computer and storage elements into a single, optimized computing package. CI is also referred to as "converged system," "unified computing," "fabric-based computing" and "dynamic infrastructure."

Hyper-Converged Infrastructure (HCI) usually refers to a fully software-defined IT infrastructure. The difference between CI and HCI is that in HCI, both the storage area network (SAN) and the underlying storage abstractions are implemented virtually in software rather than physically, in hardware.

Example techniques for operating an HCI system can be found, for example, in U.S. Pat. No. 9,830,082.

NVM Express over Fabrics (NVMF) defines a common architecture that supports a range of storage networking fabrics for NVM block storage protocol over a storage networking fabric. NVMF is specified, for example, in "NVM Express over Fabrics," Revision 1.0, Jun. 5, 2016, which is incorporated herein by reference.

SUMMARY OF THE INVENTION

An embodiment of the present invention that is described herein provides a storage and communication apparatus for plugging into a server. The apparatus includes a circuit board, a bus interface, a Medium Access Control (MAC) processor, one or more storage devices, and at least one Central Processing Unit (CPU). The bus interface is configured to connect the apparatus at least to a processor of the server. The MAC processor is mounted on the circuit board and is configured to connect to a communication network. The storage devices are mounted on the circuit board, and are configured to store data, and the CPU is mounted on the circuit board and is configured to expose the storage devices both (i) to the processor of the server via the bus interface, and (ii) indirectly to other servers over the communication network.

In an embodiment the server includes connectors that are configured to plug into one or more slots of the server and to connect the CPU, the MAC processor and the storage devices to the processor of the server. In some embodiments the circuit board is configured to plug into a single slot of the server and to connect the CPU, the MAC processor and the storage devices to the processor of the server.

According to an embodiment, the storage devices include Solid State Drives (SSDs). In some embodiments the storage devices are coupled to the CPU through dedicated bus internal to the circuit board. In an embodiment the dedicated bus includes a Peripheral Component Interconnect Express (PCIe) bus.

According to some embodiments of the present invention, the CPU is configured to expose the storage devices to the processor of the server, and to other servers over the communication network, using an NVM Express over Fabrics (NVMF) protocol.

There is additionally provided, in accordance with an embodiment of the present invention, a method including providing a circuit board for plugging into a server, the circuit board including a bus interface, a Medium Access Control (MAC) processor, one or more storage devices, and at least one Central Processing Unit (CPU). Communication is performed at least with a processor of the server using the bus interface, and with a communication network using the MAC processor. Data is stored on the one or more storage devices. Using the at least one CPU, the storage devices are exposed both (i) to the processor of the server via the bus interface, and (ii) indirectly to other servers over the communication network.

The present invention will be more fully understood from the following detailed description of the embodiments thereof, taken together with the drawings in which:

DETAILED DESCRIPTION OF EMBODIMENTS

Overview

Figure 1:
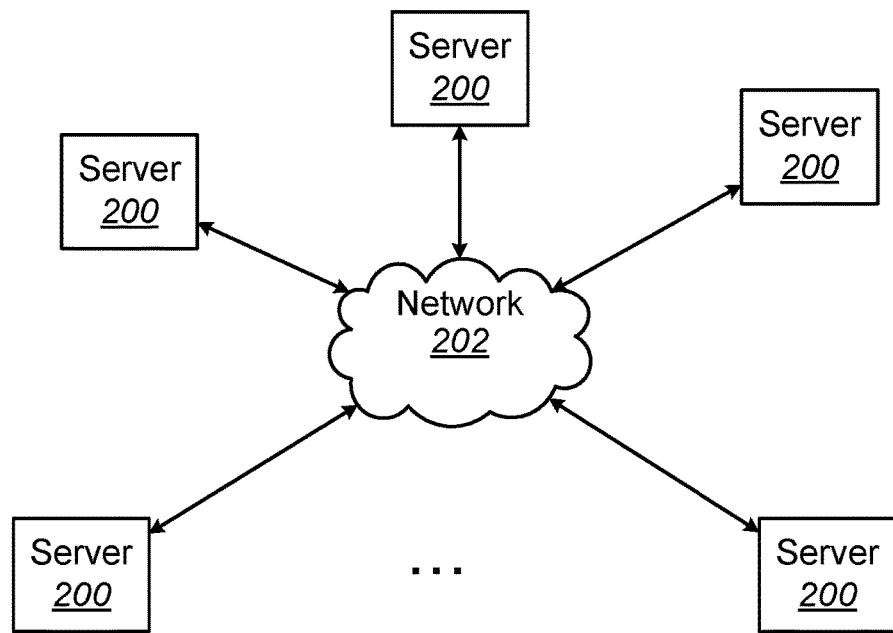
FIG. 1 is block diagram that schematically illustrates a Converged Infrastructure (CI) system, in accordance with an embodiment of the present invention.

A Converged Infrastructure (CI) system typically comprises servers inter-connected by a Network, data storage units, networking hardware and virtualization and management software. The hardware elements are organized as pools of computing, storage and networking resources shared by multiple applications, which are managed collectively by policy-based software.

IT organizations use CI to centralize the management of IT resources, to consolidate systems, to increase resource-utilization rates, and to lower costs.

The term "Hyper-Converged Infrastructure (HCI)" is mainly a marketing term, used to describe a CI with virtualization software. In the description hereinbelow the term CI will refer collectively to CI and HCI.

Nodes of a CI system are mainly computer servers, which are typically implemented in a card-cage comprising multiple PC boards, interconnected by a system bus, for example PCIe. The various PC boards typically comprise NIC boards, storage boards (for example SSD), processor boards and high-speed IO boards.

In a typical CI system, the servers are configured to expose internal resources (for example NVM storage) through the Network to other servers; virtualization software may then be used, to allow any server in the CI to access any resource (or any other server), in the same manner, whether it is locally coupled to the server or via the network.

The NVM Express over Fabrics (NVMF) specification, cited above, defines a common architecture that supports a range of storage networking fabrics for NVMe block storage protocol over a storage networking fabric. NVMF extends NVM onto fabrics such as Ethernet, Fibre Channel and InfiniBand®. NVM over Fabrics is designed to work with any suitable storage fabric technology.

A key performance goal of CI is achieving high bandwidth and low latency over the card-cage bus, as well as across the network, so that any server over the CI will be able to access resources (for example—storage) in other servers with high performance.

Elements of a server will be referred to hereinafter as "tightly coupled" to one another if they are in the same PC board, and "loosely coupled" if they are in different PC boards, e.g., coupled to each other through the system bus. Typically, communication between tightly coupled elements yields higher bandwidth and lower latency than communication between loosely coupled elements.

In embodiments of the present invention, a server comprises a NIC and an NVM storage, tightly coupled in the same PC board. Thus, reduced latency and increased bandwidth are achieved when NVMF protocol is implemented.

In some embodiments, the NVM may comprise any suitable type of non-volatile storage, e.g., SSD or otherwise, including combinations of several devices of one or multiple different types. In some embodiments, the entire NVM storage of the server may be tightly coupled to the NIC, and an additional NVM card is not used; thus, the number of PCIe slots in the server may be reduced.

In embodiments, the NVM may be tightly coupled to the NIC by means of a dedicated bus, for example Peripheral Component Interconnect Express (PCIe)

In an embodiment of the present invention, a CI cluster is implemented using standard 1U Sevres in a cost-effective manner, leveraging the ubiquitous PCIe standard, which is well accepted in the computer industry.

In embodiments of the present invention, the ability to accelerate the NVMe-Over-fabric protocol, due to the tightly-coupled NIC and storage, enables the exposure of SSD NVMe memory over the network reaching performance on the order of 8M IOPS of SSD accesses.

System Description

FIG. 1 is a block diagram that schematically illustrates a Converged Infrastructure (CI) system 100, in accordance with an embodiment of the present invention.

The CI comprises multiple servers 200, which are intercoupled through a Network 202, e.g. a Wide-Area Network (WAN).

According to embodiments of the present invention, each server 200 may comprise computing and/or storage resources, and an underlying virtualization software (not shown) may be used to expose some or all the resources of each server, to some (or all) of the other servers.

Figure 2:
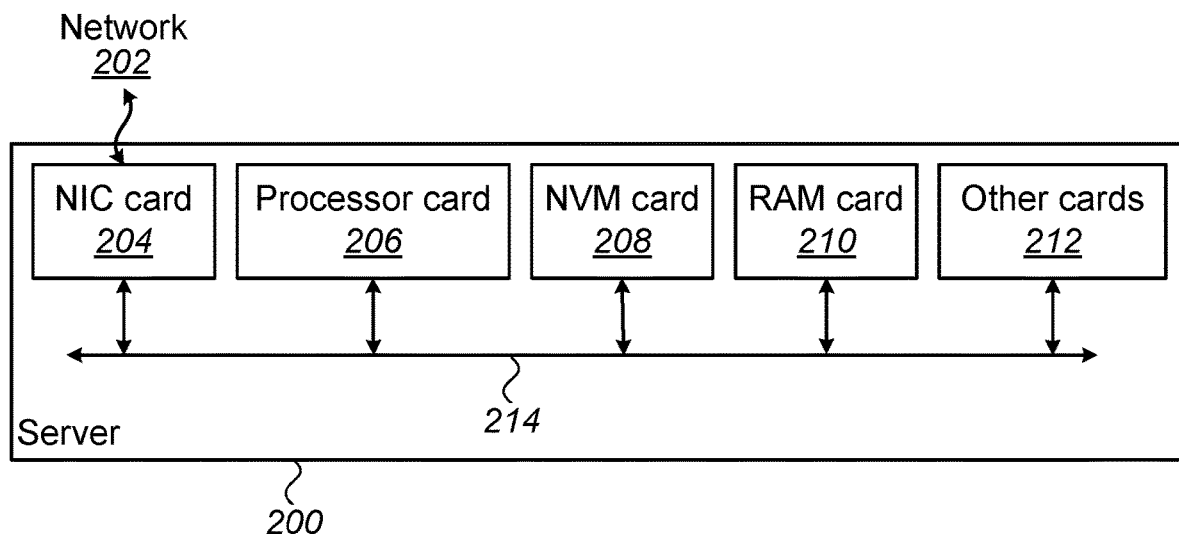
FIG. 2 is a block diagram that schematically illustrates a Server in the system of FIG. 1, in accordance with an embodiment of the present invention.

FIG. 2 is a block diagram that schematically illustrates Server 200, according to embodiments of the present invention. The server may comprise a Network Interface Controller (NIC) card 204 coupled to Network 202, a Processor card 206, a Non-Volatile Memory (NVM) card 208 (also referred to as non-volatile storage device, for example a Solid State Drive—SSD), a Random Access Memory (RAM) card 210 and other cards 212. All the cards are loosely coupled to a high-speed bus 214, which may be, for example a Peripheral Component interconnect Express (PCIe) bus.

According to embodiments of the present invention, NIC card 204 comprises one or more NVM devices, tightly coupled to (i.e., on the same circuit board as) the other elements of the NIC card. The NVM elements can be exposed to other servers over Network 202 without the need to access system bus 214. In some embodiments the NVM devices are tightly coupled through a dedicated bus; for example, Peripheral Component Interconnect Express (PCIe).

According to embodiments, NVM card 208 provides additional NVM storage, which is loosely coupled to the NIC card, and is accessed through system bus 214. Typically, NVM Card 208 contains more storage volume than the NVM devices in the NIC Card.

According to some other embodiments of the present invention, NVM card 208 may be eliminated, reducing the number of PCIe slots in server 214.

As would be appreciated, a server in accordance to the disclosed techniques is not limited to the description hereinabove. Rather, the server may comprise various combinations of some or all the cards described hereinabove, as well as other cards and modules that are not mentioned.

Figure 3:
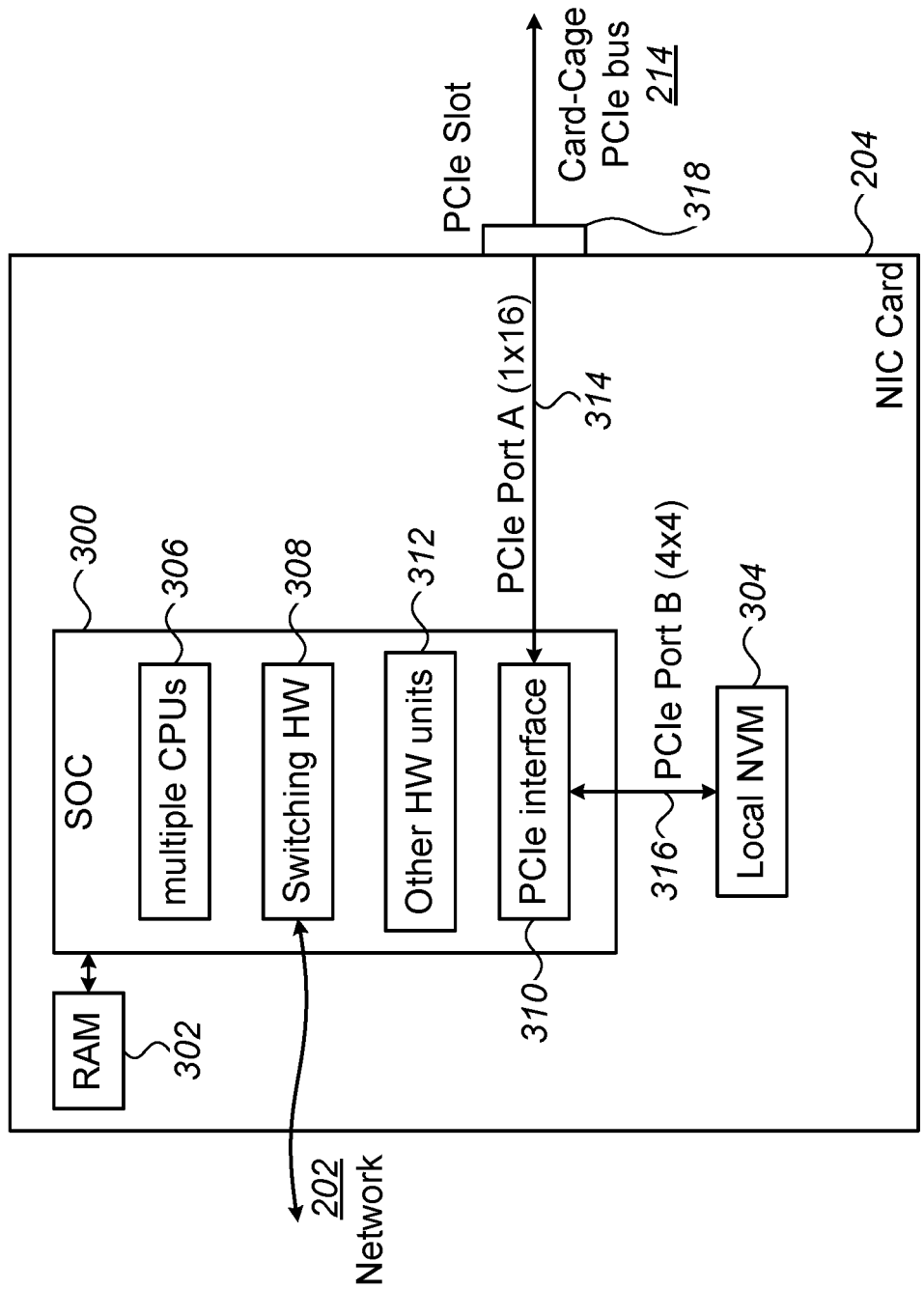
FIG. 3 is a block diagram that schematically illustrates a NIC card in the server of FIG. 2, in accordance with an embodiment of the present invention.

FIG. 3 is a block diagram that schematically illustrates NIC card 204 according to an embodiment of the present invention. All the elements of NIC card 204 seen in the figure are mounted on a single Printed Circuit Board (PCB), i.e., tightly coupled to one another.

The NIC card comprises a System on Chip (SOC) 300, a RAM 302, and an NVM unit 304. NVM unit 304 comprises one or more non-volatile storage devices. As such, the terms "NVM" and "non-volatile storage devices" are used interchangeably. In this example embodiment, SOC 300 comprises multiple CPU cores 306 (for example, ARM cores), A Medium Access Control (MAC) unit 308 (also referred to as MAC processor or switching circuitry), a PCIe Interface unit 310 and other hardware units 312.

According to embodiments of the present invention, PCIe Interface Unit 310 comprises two PCIe ports—a GEN4 1×16 PCIe Port A (314), which is coupled through a PCIe connector 318 to system bus 214 (FIG. 2), and a PCIe GEN4 4×4 Port B (316), which is coupled to NVM Unit 304.

NIC Card 204 is a highly integrated network interface card. MAC 308 in the NIC Card communicates with Network 202. CPUs 306 execute software programs, comprising network-interface functions, security functions virtualization functions and any user-defined functions. Other hardware units 312 may be used, for example, for the safe execution of security functions.

According to some embodiments, virtualization software running in some (or all) of the CPUs may be used to expose NVM 304 over Network 202 to other servers of CI 100, and, over card-cage PCIe bus 214, to Processor card 206.

SOC 300 is loosely coupled to NVM Card 208 (FIG. 2) through Port A (314) of PCIe Interface 310, PCIe connector 318 and system bus 214, which is common to all cards in Server 200. Communication bandwidth must be shared between all users of system bus 214, and latency time may comprise arbitration time between several cards.

In contrast, SOC 300 is tightly coupled to NVM 304 through Port B (316) of PCIe Interface 310. Port B is dedicated to NVM 304 access only, and hence, bandwidth may be higher and latency time shorter than those for accessing NVM 208.

Thus, according to embodiments of the present invention, other servers on CI 100, which are exposed to NVM 304 over Network 202, will benefit from higher NVM access bandwidth and lower NVM latency, than the bandwidth and latency when accessing NVM card 208. In addition, if no additional NVM storage is required, the number of PCIe slots in server 200 may be reduced.

As would be appreciated, NIC Card 204 described above is cited by way of example. Other embodiments may not include an SOC and/or RAM. A single CPU rather than multiple CPUs may be used, and local NVM 304 may be coupled through busses other than PCIe, including direct connection with no bus.

Virtualization Software

According to embodiments of the present invention, the processors of the NIC card implement both NVMe over Fabric and NVME emulation. The processors are configured to receive all storage read/write accesses and forward the accesses to either the local NVM storage, using NVMe emulation, or to storage devices in the network, using NVMe over Fabric.

In an embodiment, the processors are further configured to control the Quality of Service (QoS). Thus, for example, high QoS accesses may be forwarded to local storage with shorter latency, whereas lower QoS accesses are forwarded to remote storage with longer latency.

In another example, cold storage (e.g., storage of data that is accessed infrequently) which requires a large amount of storage and is less sensitive to latency, may be sent to remote storage devices.

Figure 4:
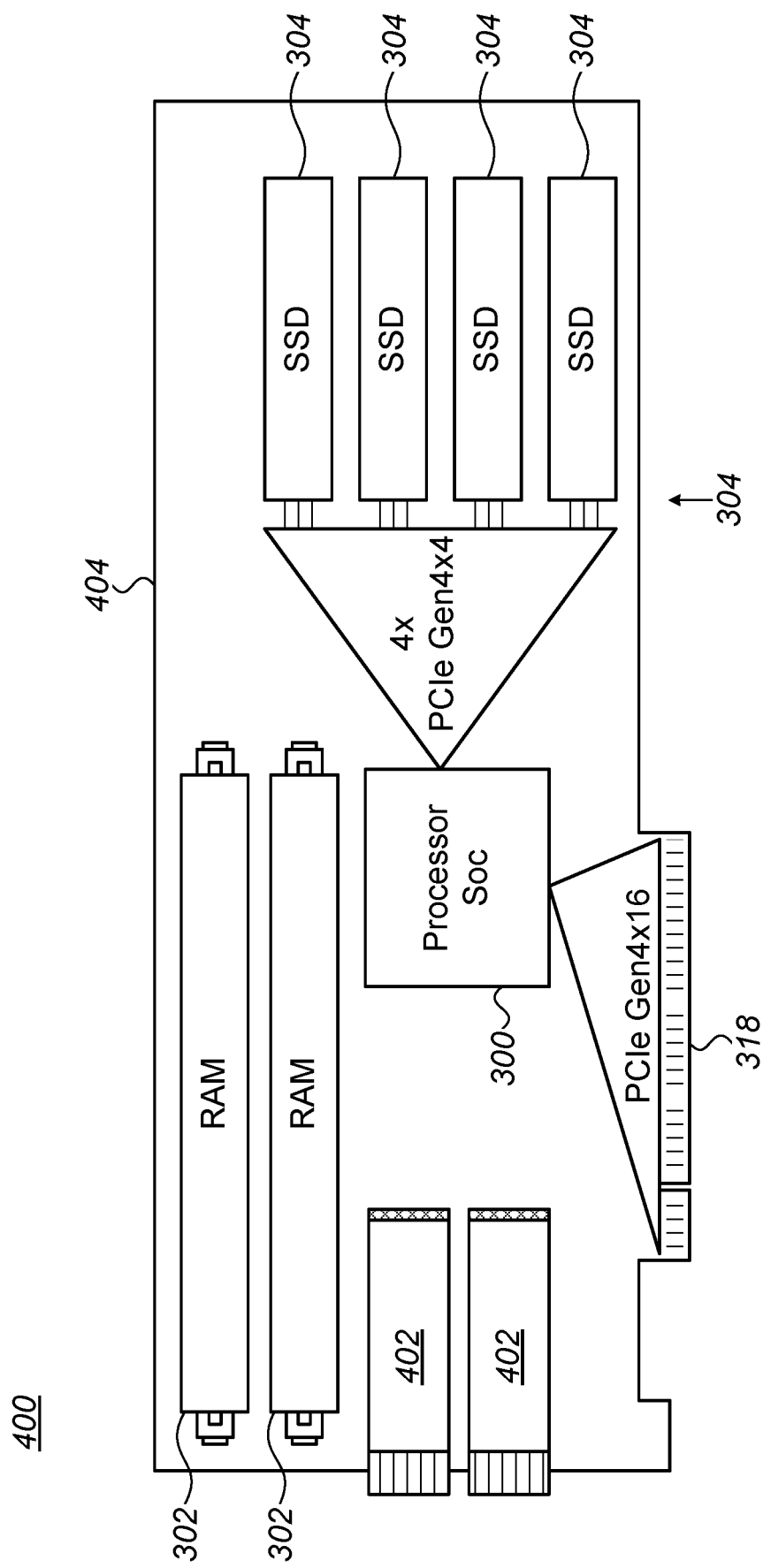
FIG. 4 is a diagram that schematically illustrates the mechanical structure of a NIC card, according to an embodiment of the present invention.

FIG. 4 is a diagram that schematically illustrates the mechanical structure 400 of NIC card 304 (FIG. 3), according to an embodiment of the present invention. NIC card 304 comprises an SOC 300, 2 RAM modules 302 (for example, DDR4 DRAM), 4 2 SSD units 304 (for example, 2-Terabyte NVM), and two connectors 402, for connection to two types of Network 202—Ethernet and Infiniband. All the elements of NIC card 304 are mounted on a single PCB 404. According to the example embodiment, 8 tera-bytes of NVM storage may be exposed to processor card 206 and/or to remote servers over the network, at speeds of up to 8M IOP operations per second. The storage capacity of SSD modules 304 is 8 tera-byte, which may be sufficient in typical NVMF applications. Thus, in the example embodiment, additional NVM cards 208 (FIG. 2) may not be needed, and the number of PCIe slots may be reduced.

Other features of NIC card 304 according to the example embodiment of FIG. 4 are depicted in the following lists:

Major Elements/Features:
  16 ARM cores.
  2 QSFP28 100 Gbps Network ports.
  Exposure of the NVMe SSDs to the Local Compute Node as PCIe devices, and over NVMf to remote Compute Nodes.
  Emulation of remote NVMe SSDs as if they are localized.
  Management of different Service Level Agreements (SLA) and Quality of Service (QOS) to different Virtual Machines (VMs) or Tenants.
  Standard Full-Height, Half-Length card, enabling a cost-effective HyperConverged Storage and Compute system.

Structure:
  16×ARM Cores @ 1120 Mhz
  ConnectX-5 NIC @ 330 Mhz
  PCIe Gen4 ×32 as DS/RC
  2 Channel DDR4 Memory Controller, 64 bit+ECC
  2×DDR4 Memory DIMMs—up to 256 GB
  4/8 TB NVMe SSD Memory
  4×1/2 TB, M.2 2280 modules Form Factor:
  Standard PCIe—FHFL DS.
  CPLD for SSD Control Signals expansion.
  16 GB eMMC Memory for SoC BIOS and OS.
  QSPI Flash for NIC Firmware.

Interfaces:
  1×Standard PCIe Gen4 ×16 on Golden Fingers Connector.
  4×PCIe Gen4 ×4 to M.2 NVMe SSD Connectors.
  2×Network ports.
  Port Flavors—Ethernet/InfiniBand®, QSFP28, Passive+ AOC 3.5 W.
  Supported Rates: 10/25/40/50/100 Gbps.
  Total Ports Throughput—160 Gbps.
  NC-SI over RMII connector enable management by external BMC.
  Debug UART interface on NC-SI reserved pins.
  Mini USB-B Connector enables SoC BIOS and OS upgrade.
  JTAG CORESIGHT 10-Pin Header for ARM DSTREAM Debug Tool.
  JTAG boundary Scan via Edge Connector.
  External PCIe Power Connector: ATX 8-pin, 75 W.

As would be appreciated, the mechanical structure of NIC Card 304, and the various components that NIC Card 304 comprises, described above, are cited by way of example. Other mechanical structure and/or components may be used. For example, buses other than PCIe may be selected; there may be any number of SSD modules 304, the port connecting SOC processor 300 to SSD units 304 may not use PCIe, the SSD modules can be of other sizes, ram modules 302 may comprise any type of DRAM or SRAM or other types of storage of any size, or they can be eliminated altogether.

The configurations of CI system 100, Server 200, NIC card 204 and SOC 300, shown in FIGS. 1-4 are example configurations that are shown purely for the sake of conceptual clarity. Any other suitable configurations can be used in alternative embodiments. The different elements of NIC card 204, such as SOC 300 and RAM 302, may be implemented using suitable hardware, such as in one or more Application-Specific Integrated Circuits (ASICs) or Field-Programmable Gate Arrays (FPGAs), using software, using hardware, or using a combination of hardware and software elements.

In some embodiments, CPUs 306 comprise general-purpose programmable processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A storage and communication apparatus for plugging into a server, the apparatus comprising:
   a circuit board;
   a bus interface, configured to connect the apparatus at least to a server processor over a system bus;
   a Medium Access Control (MAC) processor, which is mounted on the circuit board and is configured to connect to a communication network;
   one or more storage devices, which are mounted on the circuit board, and are configured to store data;
   a dedicated bus, which couples the MAC processor to the one or more storage devices; and
   at least one Central Processing Unit (CPU), which is mounted on the circuit board and is configured to expose the one or more storage devices both (i) to the server processor over the system bus via the bus interface, and (ii) indirectly to other servers through the MAC processor and over the communication network, without passing over the system bus.

2. The apparatus according to claim 1, and comprising one or more connectors, configured to plug into one or more slots of the server and to connect the CPU, the MAC processor and the storage devices to the server processor over the system bus.

3. The apparatus according to claim 1, wherein the circuit board is configured to plug into a single slot of the server and to connect the CPU, the MAC processor and the storage devices to the server processor.

4. The apparatus according to claim 1, wherein the storage devices comprise Solid State Drives (SSDs).

5. The apparatus according to claim 1, wherein the dedicated bus comprises a Peripheral Component Interconnect Express (PCIe) bus.

6. The apparatus according to claim 1, wherein the CPU is configured to expose the storage devices to the server processor, and to other servers over the communication network, using an NVM Express over Fabrics (NVMF) protocol.

7. The apparatus according to claim 1, wherein the one or more storage devices have together a capacity of at least 2 tera-bytes.

8. The apparatus according to claim 1, wherein each of the one or more storage devices comprises a 2 tera-byte storage device.

9. A method, comprising:
   providing a circuit board for plugging into a server, the circuit board comprising a bus interface, a Medium Access Control (MAC) processor, one or more storage devices, and at least one Central Processing Unit (CPU);
   communicating at least with a processor of the server over a system bus, using the bus interface;
   communicating with a communication network using the MAC processor;
   storing data on the one or more storage devices; and
   using the at least one CPU, exposing the one or more storage devices both (i) to the processor of the server over the system bus via the bus interface, and (ii) indirectly to other servers through the MAC processor and a dedicated bus over the communication network, without passing over the system bus.

10. The method according to claim 9, wherein the CPU, the MAC processor and the storage devices are connected to the processor of the server through connectors.

11. The method according to claim 9, wherein the circuit board is plugged into the server through a single connector for connecting the CPU, the MAC processor and the storage devices to the processor of the server.

12. The method according to claim 9, wherein the storage devices comprise Solid State Drives (SSDs).

13. The method according to claim 9, further comprising coupling the storage devices to the CPU through a Peripheral Component Interconnect Express (PCIe) bus.

14. The method according to claim 9, wherein exposing the storage devices to both the processor of the server via the bus interface and to other servers over the communication network comprises using an NVM Express over Fabrics (NVMF) protocol.

15. A server, comprising:
   a system bus;
   a server processor coupled to the system bus; and
   a NIC circuit board including:
      a Medium Access Control (MAC) processor, which is mounted on the NIC circuit board and is configured to connect to a communication network;
      one or more non-volatile memory (NVM) storage devices, which are mounted on the NIC circuit board, and are configured to store data;
      a dedicated bus, which couples the MAC processor to the one or more storage devices;
      a bus interface, configured to connect the MAC processor at least to the server processor over the system bus; and
      at least one Central Processing Unit (CPU), which is mounted on the NIC circuit board and is configured to expose the one or more storage devices both (i) to the server processor over the system bus via the bus interface, and (ii) indirectly to other servers over the dedicated bus, the MAC processor and the communication network, without passing over the system bus.

16. The server according to claim 15, wherein other than the NIC circuit board, the server does not include an NVM card connected to the system bus.

17. The server according to claim 15, wherein the dedicated bus is located on the NIC circuit board.

18. The server according to claim 15, wherein the dedicated bus is located on the circuit board.

* * * * *